United States Patent [19]

Bell et al.

[11] Patent Number: 5,160,637
[45] Date of Patent: Nov. 3, 1992

[54] APPARATUS AND METHOD FOR HYDROLYSIS OF CYANIDE-CONTAINING LIQUIDS

[75] Inventors: David H. Bell; Joseph E. F. Fortier; Haven M. Havens, all of Jonquiere, Canada

[73] Assignee: Alcan International Limited, Montreal, Canada

[21] Appl. No.: 600,516

[22] Filed: Oct. 19, 1990

[51] Int. Cl.$^5$ .............................................. C02F 1/66
[52] U.S. Cl. ........................................ 210/766; 210/904
[58] Field of Search .................. 423/240 R; 210/761, 210/904, 181, 741, 766

[56] References Cited

U.S. PATENT DOCUMENTS

| | | | |
|---|---|---|---|
| 4,042,502 | 8/1977 | Schmidt | 210/54 |
| 4,468,376 | 8/1984 | Suggitt | 423/240 R X |
| 4,812,243 | 3/1989 | Brandenburg | 210/761 |
| 4,877,519 | 10/1989 | Robey | 210/86 |

FOREIGN PATENT DOCUMENTS

| | | |
|---|---|---|
| 0080867 | 8/1983 | European Pat. Off. . |
| 0349035 | 3/1990 | European Pat. Off. . |
| 51-84144 | 7/1976 | Japan . |
| 55-3032 | 1/1980 | Japan . |
| 1-123687 | 5/1989 | Japan . |
| 2076388 | 12/1981 | United Kingdom . |

OTHER PUBLICATIONS

PCT/CA91/00363, International Publication Date: Oct. 10, 1991.
Kimmerle, F. M., et al., "Cyanide Destruction in Spent Potlining", Light Metals, 1989 (P. G. Campbell, (E.D.)), pp. 387–394.
Kimmerle, F. M., et al., "Hydrolysis Treatment of Cyanide in Spent Potlining Leachate", Presented at 27th Annular Congress of Metal-Lurgists—1988, CIT, Montreal 1988, pp. 1–13.
Kimmerle, F. M., et al., "Process Effluents in the Aluminum Industry: Problems or Opportunities?", Canadian Institute of Metallurgy, Halifax, Canada, Aug. 1989.

Primary Examiner—Frank Spear
Attorney, Agent, or Firm—Cooper & Dunham

[57] ABSTRACT

The invention provides an apparatus for continuous thermal hydrolysis of cyanide ions and cyanide-containing ions contained in a liquid, comprising an elongated tubular reactor of a size selected to enable the liquid to be retained in the reactor for a predetermined reaction time, a conduit for supplying the liquid to the reactor, means for adding a base to the liquid prior to heating, and means, associated with the conduit, for instantaneously and uniformly heating the liquid to a preselected temperature. The apparatus preferably uses high pressure steam to heat the liquid and appears much less subject to fouling by scale.

The invention also provides a continuous process for hydrolyzing a cyanide-containing liquid stream, comprising adjusting the pH of the liquid stream to render the liquid stream strongly basic; rapidly and uniformly heating the liquid stream to a predetermined elevated temperature; feeding the liquid to an elongated substantially vertical tubular reactor; maintaining the liquid in the reactor for a predetermined time to permit substantially complete degradation of cyanide ions and cyanide-containing ions in the liquid. The cyanide-containing liquid may preferably be uniformly and rapidly heated to the desired temperature by injecting steam under pressure into the liquid.

31 Claims, 2 Drawing Sheets

APPARATUS AND METHOD FOR HYDROLYSIS OF CYANIDE-CONTAINING LIQUIDS

BACKGROUND OF THE INVENTION

1. Field of the Invention

This invention relates to an apparatus and method for hydrolyzing cyanide ions in waste water, and more particularly to an improved apparatus and method for hydrolyzing cyanide ions in waste water into ammonia and formate by instantly and uniformly heating the liquid, for example, by injecting a hot fluid under pressure to uniformly heat the cyanide-containing liquid before it is fed into a reactor.

2. Description of the Prior Art

Various methods have been developed to hydrolyze cyanide ions which are the by-products of various industrial processes, including the reduction process for obtaining pure aluminum metal from alumina. For example, according to the patentees of U.S. Pat. No. 4,042,502 (Schmidt), cyanide ions in cyanide ion containing wastes can be oxidized to less harmful substances at high temperatures and pressures in a batch reactor. The process contemplates subjecting the liquid to a temperature shock, and then passing the cyanide-containing solution through a tubular batch process reactor at a pressure of between about 40 and 140 atm. Concentrated sulfuric acid is mixed with the cyanide solution.

U.S. Pat. No. 4,812,243 (Brandenburg) discloses a second approach to decomposition of cyanide ions in cyanide ion containing liquids. The continuous wet air oxidation treatment process in this patent appears to involve introducing a preheated, pressurized oxygen containing gas with water for dilution into a vertical bubble-type reactor where wet oxidation occurs. The waste, water and gas mix within the reactor and are raised to a temperature between about 200° to 370° C., at pressures between 300 and 2000 p.s.i.g. Brandenburg acknowledges, however, that the process seems to engender rapid scale build up. To remedy this, Brandenburg suggests providing dual reactors, allowing one to be shut down to remove scale, while the other reactor continues operation.

The high solids content of the cyanide-containing waste liquid seems to present particularly difficult scale accumulation problems, requiring the operator to frequently shut the reactor down to remove scale. An attempt to provide a continuous reactor which can continuously hydrolyze cyanide ions in a liquid into ammonia and formate is discussed in Kimmerle et al., "Cyanide Destruction in Spent Potlining," *Light Metals 89*, pp. 387-394 (P. G. Campbell (ed.)). The authors appear to propose a tubular reactor heated by a coaxial heat exchanger which hydrolyzes cyanide and ferrocyanide ions contained in an alkaline solution of spent potlining leachate. The use of heat exchangers, particularly coaxial heat exchangers, however, leads to such rapid scaling of the tubular reactor that the flow in the reactor is soon reduced to ineffective rates, necessitating shut down to remove accumulated scale.

None of the foregoing approaches has provided a satisfactory solution to the problem of cyanide ion detoxification in a continuous reactor not susceptible to scale build up.

SUMMARY OF THE INVENTION

The disadvantages of the prior art are overcome by the present invention which provides an apparatus for continuous thermal hydrolysis of cyanide ions and cyanide-containing ions contained in an alkaline liquid, comprising an elongated tubular reactor of a size selected to enable the liquid to be retained in the reactor for a predetermined reaction time to allow continuous processing of the liquid; a conduit for supplying the liquid to the reactor; and means, associated with said conduit, for instantly and uniformly heating said liquid to a preselected temperature. Where necessary, means associated with the conduit are provided for adjusting the pH of the liquid prior to heating to a pH which is strongly basic (in excess of about 12).

Preferably, the means for instantly and uniformly heating the liquid is a steam inlet included in the conduit for mixing steam under high pressure into the liquid to heat the liquid rapidly and uniformly to a predetermined temperature, but it can also (less desirably) be a highly efficient heater, such as an electric heating coil, which rapidly and uniformly raises the temperature of the liquid to a preselected temperature as it passes adjacent the heater.

The invention also provides an apparatus for continuous thermal hydrolysis of cyanide ions in a cyanide-containing liquid, comprising an elongated tubular reactor of a size selected to enable liquid to be contained in the reactor for a predetermined reaction time; a conduit for supplying cyanide-containing liquid to the reactor; inlet means, in fluid communication with the conduit, for injecting a hot fluid into the liquid such that the liquid is uniformly heated to a predetermined temperature upon entering the reactor; and means for adjusting the pH of cyanide-containing liquid to a pH in excess of about 12.

Preferably, the hot fluid is steam, and the means for injecting a hot fluid injects steam into the liquid at a pressure of between about 120 and about 300 p.s.i.g., with the preferred pressure being about 150-200 p.s.i.g., so that the temperature of the cyanide-containing liquid upon entering the reactor ranges from about 100° C. to about 300° C. The means for injecting a fluid preferably comprises a venturi having a liquid inlet into which the cyanide-containing liquid may enter, a steam inlet for introducing steam under pressure into the cyanide-containing liquid, and a liquid outlet from which cyanide-containing liquid having steam injected therein passes to the reactor.

Advantageously, the reactor comprises an elongated substantially vertical tube for continuously processing a waste stream containing cyanide ions in the form of either free cyanide ions, complex ferrocyanide ions, or both, such as may be contained in spent potlining used in the production of aluminum. The elongated reactor tube preferably includes at least one external heating apparatus for maintaining the fluid in the reactor at the desired elevated temperature. To reduce scaling, the heat output of the apparatus should be less than 10 watts per square inch (1.55 watts per square centimeter).

The invention additionally provides an apparatus for hydrolyzing cyanide ions in an aqueous, basic cyanide-containing liquid, comprising a reactor including an elongated substantially vertical tube having external heating apparatus for heating liquid contained in the tube; and a venturi for mixing cyanide-containing liquid with steam under pressure prior to feeding the liquid to the reactor. The venturi includes a liquid inlet, means for injecting steam under pressure into the cyanide-containing liquid as the liquid passes through the venturi, and a liquid outlet for passing the heated liquid to the reactor. Preferably, steam is injected into the venturi at a pressure ranging from about 120 to about 300 p.s.i.g., and the liquid in the reactor is maintained at a temperature ranging from about 150° C. to about 250° C.

The invention further provides a process for hydrolyzing a cyanide-containing liquid stream comprising: rapidly and uniformly heating the liquid to a predetermined elevated temperature, feeding the liquid to an elongated substantially vertical tubular reactor, maintaining the liquid in the reactor for a predetermined time to permit substantially complete degradation of cyanide ions and cyanide-containing ions in the liquid. Where necessary, a base may be added to the cyanide-containing liquid to adjust the pH to one in excess of 12. The base for use in the process may be aqueous caustic soda, either freshly dissolved in fresh water or in a compatible wastewater stream. Also, the base may be spent Bayer process liquor having adequate caustic soda content.

The step of rapidly and uniformly heating the liquid may advantageously be accomplished by feeding steam under pressure into the liquid, or less desirably by passing the liquid near or through an electrical heater.

If steam injection is used, the steam should preferably be injected under a pressure ranging from 120 to about 300 p.s.i.g., and no matter how the temperature of the liquid is initially raised, it should be as free from temperature gradients as possible. The liquid in the reactor should be maintained at a temperature ranging from about 150° C. to about 200° C. for a predetermined time, usually between about 30 and about 90 minutes. In a presently preferred practice of the process, the steam is injected into the cyanide-containing liquid through a steam inlet in a venturi located near the entry of the reactor.

The invention further provides a process for hydrolyzing an alkaline cyanide-containing liquid, comprising: feeding the alkaline, cyanide-containing liquid through a venturi; injecting into the venturi steam at a pressure from about 120 to about 300 p.s.i.g. to heat the liquid passing through the venturi to a temperature between about 150° C. and about 250° C.; feeding the heated liquid to a continuous cyanide degradation reactor comprising an elongated substantially vertical tube; and retaining the liquid in the reactor at an elevated temperature for a predetermined time to allow the cyanide to hydrolyze.

Preferably, the elevated temperature ranges from about 150° C. to about 200° C., and the predetermined time during which the liquid remains in the reactor is between about 20 and about 90 minutes, with between about 30 and about 60 minutes appearing to give desirable results. This process may most easily be accomplished using a continuous cyanide degradation reactor having an elongated vertical tube of about 12 inches in diameter and about 35 feet in length, which is in fluid communication with the venturi. The dimensions are, of course, a function of the flow rate it is desired to process.

Further features and advantages of the invention will be apparent from the detailed description of the preferred embodiments set forth below, together with the accompanying drawings.

DETAILED DESCRIPTION OF THE PREFERRED EMBODIMENTS

The storage and eventual recycling or conversion of spent potlining leachate from the aluminum reduction process constitutes one of the aluminum industry's major environmental concerns. During operation of aluminum reduction cells, in which alumina is reduced to aluminum metal, cyanide ions ($CN^-$) are formed at the cathode with the carbonaceous material held at reducing potential through what is probably a still unknown mechanism. The cyanides are mostly in the form of sodium cyanide salts and tend to collect in the cooler areas of the potlining such as the sidewall blocks and cathode blocks closest to the busbars. Thiocyanates may form, perhaps due to the residual sulfur in the original cathode materials, or perhaps due to transport of sulfate ions from anode to cathode followed by the reduction of sulfite and other electronegative species.

In addition, large amounts of water are used to cool the reduction cell during potlining removal. When the spent potlining, including not only the carbon blocks, sidewall and monolithic carbon, but also the refractory brick, parts of the shell, together with the odd piece of iron, steel and aluminum, are stored for any extended period of time, the highly soluble sodium cyanide will react under humid conditions with any rust present to form a stable iron cyanide complex. Moreover, containment of spent potlining in a landfill or a temporary storage site permits rain water contacting the spent potlining to leach cyanide out of the carbon matrix, and the cyanide ions often convert to more stable metal cyanide complexes.

The waste water from potlining storage facilities typically contains the following concentrations of cyanide ions and other chemicals:

| | |
|---|---|
| Fluoride | 3 g/l |
| Total Cyanide | 5 g/l |
| Ferrocyanide [Fe(CN)$_6$]$^{4-}$ | 4280 ppm |
| Ferricyanide [Fe(CN)$_6$]$^{3-}$ | <10 ppm |
| Thiocyanate (SCN$^-$) | 510 ppm |
| Sodium Sulfate | 6 g/l |
| Sodium Carbonate | 40 g/l |

The cyanide, in whatever form it occurs, must be hydrolyzed or otherwise converted into more harmless species such as ammonia and formate. Ferricyanide complexes may be hydrolyzed in a strong base according to the following general equations:

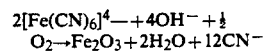

and,

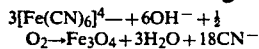

Thereafter, the cyanide ion ($CN^-$) forms ammonia and formic acid or formate according to the equation below:

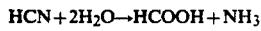

Figure 1:
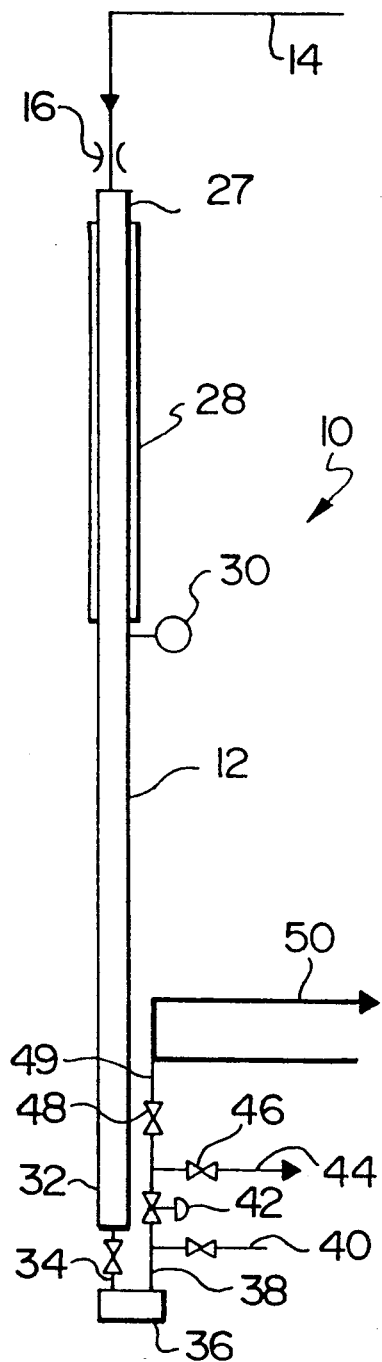
FIG. 1 is a schematic flow diagram of the improved continuous reactor apparatus of the present invention.

Base catalyzed degradation of cyanide can occur in an apparatus for continuous thermal hydrolysis of cyanide ions in a cyanide-containing liquid, schematically diagrammed in FIG. 1 and generally designated by the reference numeral 10. The apparatus 10 generally comprises an elongated tubular reactor 12 sized to enable cyanide-containing liquid to be held in the reactor 10 for a predetermined reaction time, a conduit 14 for supplying a cyanide-containing liquid to the reactor 12, and an inlet 16, in fluid communication with the conduit 14, for injecting a hot fluid into the liquid. As stated previously, the reactor operates in basic conditions, so the apparatus also includes means (not shown) for adjusting the pH of the cyanide-containing liquid to one which is strongly basic. This pH adjustment may be easily accomplished by adding a base such as spent Bayer process liquor or caustic soda, so that the pH of the cyanide-containing liquid will be strongly basic (in excess of about 12).

Figure 2:
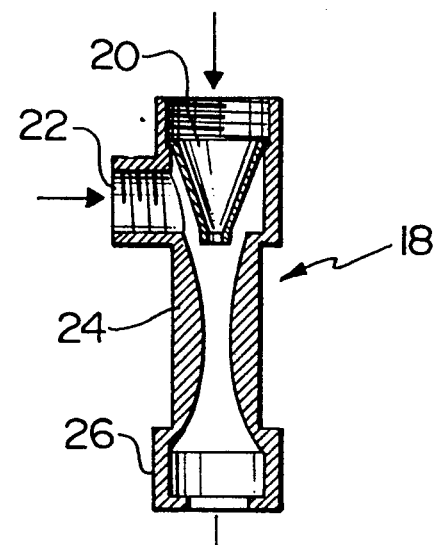
FIG. 2 is a front elevational view, partly in section, of a hot fluid injecting apparatus for use in the preferred embodiment of the improved continuous reactor apparatus of FIG. 1.

As best shown in FIG. 2, the inlet 16 (FIG. 1) includes a mild steel venturi 18 having a first bell shaped orifice 20 through which cyanide-containing liquid (not shown) may enter. The orifice 20 also includes at one side a steam entrance 22, such as a nozzle or other fitting to which a 2" diameter high pressure steam carrying pipe (not shown) may be connected. The venturi 18 includes a constriction 24 followed by a second bell shaped orifice 26 through which the cyanide-containing liquid (not shown) rapidly or instantly heated to a uniform temperature (i.e. substantially without temperature gradients) by the injection of steam may pass to the reactor 12. The venturi 18 should preferably be 18 inches long and have a diameter of about 1 inch at the inlet 16, and a diameter of about ⅜ inches at the narrowest part of the constriction 24.

Referring again to FIG. 1, the elongated tubular reactor 12 is preferably a heat treated Incoloy 600 tube about 35 feet in length and about 12 inches in diameter. The exact dimensions of the tubular reactor 12 are not critical, provided that the length and diameter are chosen with a view toward obtaining sufficient retention time of the cyanide-containing liquid in the reactor to permit substantially complete (>99.9%) degradation of cyanide ions contained in the liquid, while maintaining sufficiently high velocity of the liquid being processed to permit continuous processing of the waste without fouling by scale. The following dimensions are illustrative:

| Piping Diameter | | Nominal Diameter of Reactor | | Permissible Throughput | |
|---|---|---|---|---|---|
| in | (mm) | in | (cm) | USGPM | (L/min) |
| ⅞ | 22 | 16 | 41 | 6 | 23 |
| ⅝ | 16 | 12 | 30.5 | 3 | 11.4 |
| 1¼ | 32 | 24 | 61 | 12 | 45.4 |

At least the upper portion 27 of the elongated tubular reactor 12 is preferably surrounded by at least one concentric electrical heating element 28 or other heat exchanger to maintain the liquid in the reactor at an elevated temperature of between about 150° C. and about 250° C. during processing. The liquid level in the reactor 12 is measured by a level controller 30. At the other end 32 of the reactor 12, the elongated tube drains through a one-inch diameter drainage pipe 34 into a one-foot diameter, 2 foot long horizontal tank or pot at the bottom of which may collect any large scale or other particles leaving the reactor 12.

The tank 36 has an exit pipe 38 (⅜ inch dia.) which includes a sampling port 40 and a control valve 42. Recycling conduit 44 carries liquid back to the contaminated liquid conduit 14, where necessary to reprocess the liquid. The flow of liquid into the recycling conduit 44 may be controlled by a second control valve 46. An on-off valve 48 located in run-off pipe 49 also helps control the liquid processing rate. The apparatus for continuous hydrolysis of a cyanide-containing liquid 10 preferably discharges the liquid (not shown) into a six-inch diameter discharge pipe 50 through which is flowing a cooler liquid stream from another compatible process, where available. Optionally, the decontaminated liquid can also be fed to a series of flash tanks (not shown) where the pressure can be released until it returns to atmospheric pressure. Noise reduction may be effected by drilling numerous ⅛ inch diameter holes (not shown) in the ⅜ inch diameter discharge pipe 38 feeding into the 6 inch diameter pipe 50. These holes act as silencers.

The improved process of the present invention as it may be used for continuous treatment of cyanide ion containing spent potlining leachate from the reduction of alumina into aluminum metal may also be understood by reference to FIG. 1. The cyanide ion containing liquid (not shown) feeds into conduit 14, where caustic soda or alkaline spent Bayer process liquor may be added, for example, as an 80:20 mixture of leachate and Bayer liquor (containing about 200 g/l NaOH expressed as $Na_2CO_3$). Sufficient base is added, where necessary, to adjust to the pH of the leachate/liquor mixture to greater than 12. The alkaline or basic cyanide ion containing liquid (not shown) next flows into the inlet 16 located between the conduit 14 and the reactor 12, where a hot fluid such as steam under pressure is injected to rapidly and uniformly raise the temperature of the liquid entering the reactor. Alternatively, the liquid may be flash heated using an electric heating device located outside the reactor.

Preferably, the hot fluid is steam which is injected directly into the cyanide-containing liquid at a pressure between about 120 and about 300 p.s.i.g., with about 150 to about 200 p.s.i.g. being presently preferred. The high pressure steam injection heats the cyanide-containing liquid more thoroughly and uniformly than heat exchangers or direct localized electrical heating located in the reactor, and avoids an excessively large temperature gradient, which may lead to the formation and deposition of scale on the inner walls of the reactor and the piping. Preferably, the temperature of the cyanide-containing liquid when it enters the elongated reactor tube is in the range from about 90° C. to about 120° C.

The steam injected cyanide-containing liquor next flows into the upper portion 27 of the reactor 12 where it receives further heating by electrical heaters 28 surrounding the walls of the reactor 12. The electrical heaters 28 preferably provide about 10 watts per $inch^2$ or less to prevent or substantially reduce scale formation at the point of heating.

The cyanide-containing liquid is maintained in the substantially vertical elongated reactor tube 12 for a retention time of between about 20 to about 90 minutes, depending on the temperature of the liquid. About 30 to 60 minutes of reaction time seems sufficient to degrade the cyanide contained in the liquid and is therefore preferred. Advantageously, the piping in the reactor 12 is predominantly vertical to help prevent scale build-up (which is more likely to occur on a horizontal surface) and of a sufficiently narrow diameter so that the linear velocity of the liquor is at least 8.6 m/sec, in order to further reduce the opportunity for scale build-up on the interior walls of the reactor 12.

The liquid travels through the reactor tube 12, and when it reaches the lower portion 32 of the tubular reactor 12, it flows into a narrower drainage pipe 34 and then into the tank or pot 36 where any scale particles contained in the liquid may settle. The liquid continues to flow through the exit pipe 38 where it may be sampled at the sampling port 40 to determine the percentage of CN⁻ which has been destroyed.

From here, the liquid may be fed through recycling pipe 44 to direct it back to the feed conduit 14 to enable further processing, if necessary, to reduce the amount of cyanide contained in the liquid. Liquid not shunted into the recycling pipe 44 continues through to a discharge pipe 50 where it may enter a series of flash tanks (not shown) to return the liquid to atmospheric pressure. It may also be fed into a cooler stream of compatible liquid for further use or eventual discharge.

The following examples are intended to be illustrative and representative of the practice of the invention, and not to be construed as limiting the scope of the invention in any manner.

EXAMPLE 1

Figure 3:
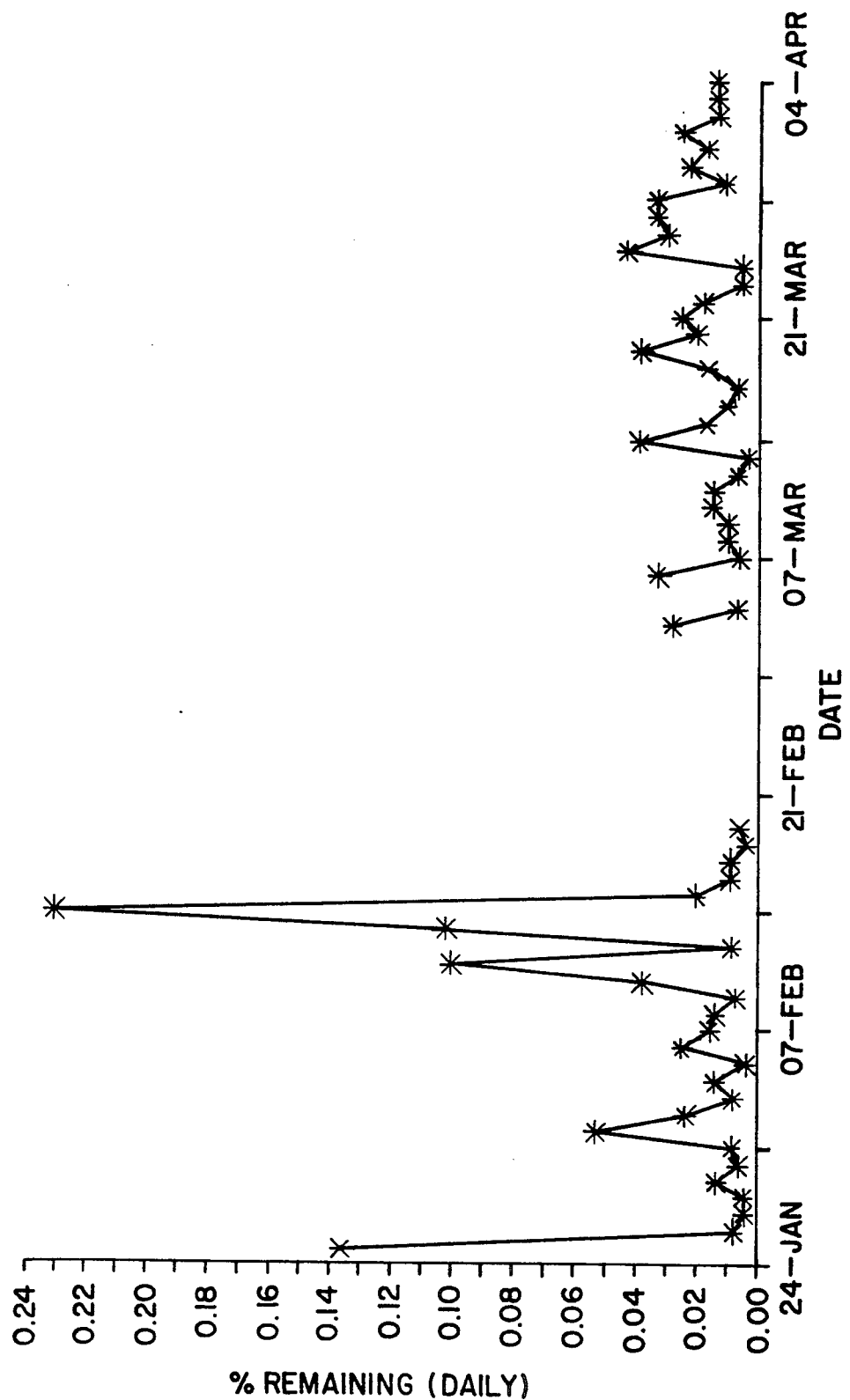
FIG. 3 is a graphical representation of the weekly average of the percentage of cyanide remaining after hydrolysis to ammonia and formate in an actual test of the improved continuous reactor apparatus of FIG. 1 over a seven month period.

The reactor apparatus using steam injection and accessory heating in accordance with the foregoing description was tested for a seven month period without any blockages due to scaling. The composition of the liquid was tested and found to be in accordance with Table 1 above, and the weekly average the level of destruction of the cyanide content is shown in the graph in FIG. 3. Steam pressure was regulated to be fed in at a pressure between about 160 and about 190 p.s.i.g. The injection of steam instantly and uniformly raised the temperature of the liquid so that it ranged from about 90° C. to about 100° C. on entry into the continuous reactor. Accessory heating maintained the temperature of the liquid in the reactor from about 160° C. to about 190° C. This test data indicates a level of cyanide destruction above 99.9% and that the reactor apparatus of the present invention can be operated almost continuously for at least six months without scale build up interfering with its operation.

EXAMPLE 2

A reactor 12 inch (30 cm) inside diameter and 35 feet (10.6 m) high with an effective height of 16.5 ft (5 m), excluding the top space and heating element area, provides a residence time of 34 minutes at 2.65 USGPM (10 L/min) of cyanide-containing liquid. To give 99.9% and higher destruction of the distillable cyanides a temperature of 350° F. (177° C.) is required.

Direct injection (venturi) of steam at 180 p.s.i.g. (12.4 bar) raises the liquid temperature at the inlet of 212° F. (100° C.). Accessory heaters supplying 50 kW of energy maintain the liquid at an elevated temperature of about 350° F. (177° C.) in the reactor.

EXAMPLE 3

Using the same reactor for the same percentage destruction, using steam only for heating, a flow rate of cyanide-containing liquor at 2.65 USGPM (10 L/min) given a residence time in the reactor of 45 minutes requiring an operating temperature of 343° F. (173° C.). Steam was fed in at an average pressure of about 180 p.s.i.g.

We claim:

1. An apparatus for continuous thermal hydrolysis of cyanide ions and cyanide-containing ions contained in a alkaline liquid, comprising:
   an elongated substantially vertical tubular reactor of a size selected to enable to cyanide-containing alkaline liquid to be retained in the reactor for a predetermined reaction time to allow continuous processing of the liquid;
   a conduit for supplying the cyanide-containing alkaline liquid to the reactor; and
   means, associated with said conduit, for instantly and uniformly heating said liquid to a preselected temperature to continuously hydrolyze said cyanide-containing liquid substantially without accumulation of scale in said elongated substantially vertical tubular reactor.

2. An apparatus in accordance with claim 1, additionally comprising means for adjusting the pH of said liquid to a strongly basic pH.

3. An apparatus in accordance with claim 1, wherein said means for instantly and uniformly heating said liquid is a stream inlet included in said conduit for mixing steam under high pressure into said liquid to instantly and uniformly heat said liquid to a preselected temperature.

4. An apparatus in accordance with claim 1, wherein said means for instantly and uniformly heating said liquid is an electrical heater which rapidly and uniformly raises the temperature of the liquid to a preselected temperature as it passes adjacent to the heater.

5. An apparatus for continuous thermal hydrolysis of cyanide ions in an alkaline cyanide-containing liquid, comprising:
   an elongated substantially vertical tubular reactor of a size selected to enable the alkaline cyanide-containing liquid to be retained in the reactor for a predetermined reaction time;
   a conduit for supplying cyanide-containing liquid to said reactor; and
   means, in fluid communication with said conduit, for injecting a hot fluid into said liquid such that the liquid is uniformly heated upon entering said reactor to continuously hydrolyze said cyanide-containing liquid substantially without accumulation of scale in said elongated substantially vertical tubular reactor.

6. An apparatus in accordance with claim 5, additionally comprising means for adjusting the pH of said liquid to a strongly basic pH.

7. An apparatus in accordance with claim 5, wherein said hot fluid is steam.

8. An apparatus in accordance with claim 7, wherein said means for injecting a hot fluid into said liquid injects steam into said liquid at a pressure of between about 120 and about 300 p.s.i.g.

9. An apparatus in accordance with claim 8, wherein said means for injecting a hot fluid injects steam into said liquid in said conduit at a pressure of about 180 p.s.i.g.

10. An apparatus in accordance with claim 8, wherein the temperature of said cyanide-containing liquid in said reactor ranges from about 100° C. to about 300° C.

11. An apparatus in accordance with claim 8, wherein said reactor comprises an elongated substantially vertical tube.

12. An apparatus in accordance with claim 8, wherein said cyanide ions are in the form of free cyanide ions or a ferrocyanide ion complexes contained in spent potlining leachate.

13. An apparatus in accordance with claim 11, wherein said substantially vertical elongated tube additionally comprises at least one external heating apparatus surrounding said substantially vertical elongated tube for maintaining at least a portion of said liquid in said reactor at an elevated temperature.

14. An apparatus in accordance with claim 8, wherein said means for injecting a fluid comprises a venturi having a liquid inlet into which said cyanide-containing liquid may enter, an inlet for introducing steam under pressure into said cyanide-containing fluid, and a liquid outlet from which cyanide-containing liquid having steam introduced therein passes to said reactor.

15. An apparatus for hydrolyzing cyanide ions in an aqueous, basic cyanide-containing liquid, comprising:
   a reactor including an elongated substantially vertical tube having external heating apparatus for heating liquid contained in said tube; and
   a venturi for mixing cyanide-containing basic liquid with steam under pressure prior to feeding said liquid to said reactor, said venturi including a liquid inlet, means for injecting steam under pressure into said cyanide-containing liquid as said liquid passes through said venturi and a liquid outlet for passing said liquid to said reactor to continuously hydrolyze said cyanide-containing liquid substantially without accumulation of scale in said elongated substantially vertical tubular reactor.

16. An apparatus in accordance with claim 15, wherein said steam is injected into said venturi at a pressure ranging from about 120 to about 300 p.s.i.g.

17. An apparatus in accordance with claim 15, wherein the liquid in said reactor is maintained at a temperature ranging from about 150° C. to about 250° C.

18. A process for hydrolyzing an alkaline cyanide-containing liquid stream, comprising:
   rapidly and uniformly heating said alkaline cyanide-containing liquid to a predetermined elevated temperature;
   feeding said liquid to an elongated substantially vertical tubular continuous cyanide degradation reactor; and
   maintaining said liquid in said reactor for a predetermined time to permit substantially complete degradation of cyanide ions and cyanide-containing ions in said liquid to continuously hydrolyze said cyanide-containing liquid substantially without accumulation of scale in said elongated substantially vertical tubular reactor.

19. A process in accordance with claim 18, additionally comprising the step of adjusting the pH of said liquid to make said liquid strongly basic.

20. A process in accordance with claim 19, wherein strongly basic is a pH in excess of about 12 and this pH is adjusted using aqueous base or spent Bayer process liquor.

21. A process in accordance with claim 18, wherein said step of rapidly and uniformly heating said liquid is accomplished by passing said liquor adjacent to an electrical heater.

22. A process in accordance with claim 18, wherein said step of rapidly and uniformly heating said liquid is accomplished by feeding steam under pressure into said liquid before said liquid is fed into said reactor.

23. A process in accordance with claim 22, wherein said steam is fed into said liquid under a pressure ranging from 120 to about 300 p.s.i.g. and said elevated temperature ranges from about 150° C. to about 250° C.

24. A process in accordance with claim 23, wherein the liquid in the reactor is maintained at a temperature ranging from about 150° C. to about 200° C.

25. A process in accordance with claim 24, wherein the predetermined time is between about 30 and about 90 minutes.

26. A process in accordance with claim 25, wherein said steam injected through a steam inlet in a venturi located near the entry of said reactor.

27. A process for hydrolyzing an alkaline cyanide-containing liquid, comprising:
   feeding said alkaline, cyanide-containing liquid through a venturi;
   injecting steam into said venturi at a pressure from about 120 to about 300 p.s.i.g. to heat said liquid passing through said venturi to a temperature of between about 150° C. and about 250° C.;
   feeding said heated liquid to a reactor comprising an elongated substantially vertical tube; and
   retaining said liquid in said reactor at an elevated temperature for a predetermined time to allow said cyanide to hydrolyze so as to continuously hydrolyze said cyanide-containing liquid substantially without accumulation of scale in said elongated substantially vertical tubular reactor.

28. A process in accordance with claim 27, wherein said elevated temperature ranges from about 150° C. to about 200° C.

29. A process in accordance with claim 28, wherein said predetermined time is between about 20 and about 90 minutes.

30. A process in accordance with claim 28, wherein said predetermined time is between about 30 to about 60 minutes.

31. A process in accordance with claim 27, wherein said elongated vertical tube is about 12 inches in diameter and about 35 feet in length, and is in fluid communication with said venturi.

* * * * *